United States Patent
Brown

(10) Patent No.: US 10,234,968 B2
(45) Date of Patent: Mar. 19, 2019

(54) POSITION-BASED RECONFIGURABLE CONTROL KNOB

(71) Applicant: Continental Automotive Systems, Inc., Auburn Hills, MI (US)

(72) Inventor: Arthur S. Brown, Sterling Heights, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/955,383

(22) Filed: Dec. 1, 2015

(65) Prior Publication Data

US 2017/0153718 A1 Jun. 1, 2017

(51) Int. Cl.
*G06F 3/0362* (2013.01)
*B60K 37/06* (2006.01)
*G06F 3/041* (2006.01)

(52) U.S. Cl.
CPC ............ *G06F 3/0362* (2013.01); *B60K 37/06* (2013.01); *G06F 3/0412* (2013.01); *B60K 2350/102* (2013.01); *B60K 2350/104* (2013.01); *B60K 2350/1008* (2013.01); *B60K 2350/1028* (2013.01)

(58) Field of Classification Search
CPC ................. G06F 3/0362; B60K 37/06; B60K 2350/1008; B60K 2350/1028
See application file for complete search history.

(56) References Cited

U.S. PATENT DOCUMENTS

| 5,441,483 A * | 8/1995 | Avitall | A61B 18/1492 |
| | | | 604/95.05 |
| 6,642,919 B1 * | 11/2003 | Jaeger | G06F 1/1601 |
| | | | 345/1.2 |
| 8,199,114 B1 * | 6/2012 | Jaeger | G06F 3/03545 |
| | | | 178/18.01 |

(Continued)

FOREIGN PATENT DOCUMENTS

| JP | 2004070505 A | 3/2004 |
| JP | 2008059796 A | 3/2008 |

OTHER PUBLICATIONS

International Search Report and Written Opinion dated Mar. 29, 2017 from corresponding International Patent Application No. PCT/US2016/063366.

(Continued)

*Primary Examiner* — Lixi C Simpson

(57) ABSTRACT

An apparatus includes a knob that is repositionable into a first position and a second position. The knob may be configured to control a first set of parameters in the first position and a second set of parameters in the second position. The apparatus may include a reconfigurable display configured to selectively display at least a first display configuration and a second display configuration. The system may be configured to display the first display configuration on the reconfigurable display when the knob is in the first position, and the system may be configured to display the second display configuration on the reconfigurable display when the knob is in the second position. The apparatus may also include a slider device having a set of rails defining a track between the rails. The knob may be slidable along the slider device into the first and second positions.

5 Claims, 3 Drawing Sheets

(56) References Cited

U.S. PATENT DOCUMENTS

| | | | |
|---|---|---|---|
| 2005/0168434 A1* | 8/2005 | Wang-Yang | G09G 3/3637 |
| | | | 345/103 |
| 2006/0007179 A1* | 1/2006 | Pihlaja | G06F 3/04886 |
| | | | 345/173 |
| 2007/0057915 A1 | 3/2007 | Yamauchi | |
| 2008/0167091 A1* | 7/2008 | Wang | G06F 1/1626 |
| | | | 455/575.1 |
| 2008/0211779 A1* | 9/2008 | Pryor | G01C 21/3664 |
| | | | 345/173 |
| 2010/0321215 A1* | 12/2010 | Kato | H01H 25/008 |
| | | | 341/35 |
| 2011/0025488 A1* | 2/2011 | Leon | B60K 37/06 |
| | | | 340/456 |
| 2013/0241822 A1* | 9/2013 | Sharma | G06F 3/02 |
| | | | 345/156 |

OTHER PUBLICATIONS

English Translation of Abstract of JP2004070505.
English Translation of Abstract of JP2008059796.

* cited by examiner

POSITION-BASED RECONFIGURABLE CONTROL KNOB

FIELD OF THE INVENTION

The present invention relates to a control knob for a vehicle that is repositionable to control more than one set of parameters.

BACKGROUND OF THE INVENTION

In the field of automotive vehicle interiors, previously there were several dials, rotary switches, or knobs required to control various systems within the vehicle. For example, one knob was used to control audio volume, another knob was used to control fan speed, and yet another knob was used to control temperature, etc., by way of example. Thus, temperature controls, audio controls, and navigation controls, among other controls, were displayed on multiple displays, with corresponding knobs to control these systems.

Styling and technology trends have encouraged the use of a reconfigurable touch screen for multiple systems, to minimize the number of screens and knobs required within a vehicle. However, these systems limit haptic feedback and require a vehicle driver to shift his or her eyes away from the road to scan the control choices, focus on pressing the desired control in the correct location, and confirm the interface has recognized the input. Drivers are districted for an undesirable amount of time when attempting to navigate these systems.

Accordingly, there is a need to improve the control systems within a vehicle such that minimal controls are required without distracting the driver from the primary task of monitoring the road, while also minimizing the number of displays and controls.

SUMMARY

The present disclosure provides a control knob that is repositionable to allow control of a reconfigurable display, which provides haptic feedback, by virtue of the knob, while at the same time providing for reconfigurability via the display.

In one variation, which may be combined with or separate from the other variations described herein, a vehicle human-machine-interface system includes a reconfigurable display configured to selectively display at least a first display configuration and a second display configuration. The first and second display configurations are at least partially different from each other. The system also includes a knob that is repositionable along the reconfigurable display in at least a first position and a second position. The system is configured to display the first display configuration on the reconfigurable display when the knob is in the first position, and the system is configured to display the second display configuration on the reconfigurable display when the knob is in the second position.

In another variation, which may be combined with or separate from the other variations described herein, a parameter selection device includes a slider device having a set of rails defining a track between the rails, and a knob slidable along the slider device into at least a first position and a second position. The knob is configured to control a first set of parameters in the first position and a second set of parameters in the second position. The first and second sets of parameters are different from each other.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Examples are reflected in the drawings, which will be described below. The drawings described herein are for illustration purposes only and are not intended to limit the scope of the present disclosure in any way.

The present disclosure will become more fully understood from the detailed description and the accompanying drawings, wherein.

DETAILED DESCRIPTION

The following description is merely exemplary in nature and is in no way intended to limit the invention, its application, or uses.

Figure 1:
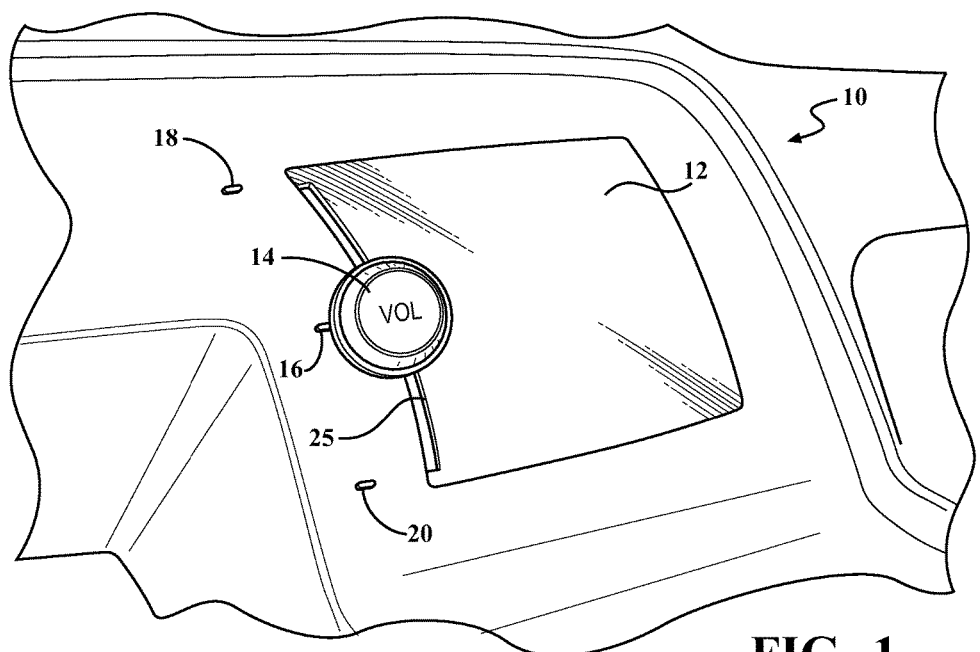
FIG. 1 is a schematic perspective view of a system including a knob in a first position, according to the principles of the present disclosure.

Referring now to FIG. 1, a vehicle human-machine-interface system for use in a motor vehicle is generally indicated at reference number 10. The vehicle human-machine-interface system 10 used in the present embodiment can be used for any type of vehicle interface, including, but not limited to vehicle infotainment systems, sound radio systems, environmental HVAC systems, communications, driver interface modules, global positioning systems or other navigation systems, vehicle lighting, vehicle audio, or virtually any other type of system in a vehicle. It is also within the scope of this system 10 to be located at another location and be operated by a person other than a driver. For example, the arrangement 10 could be located in an area where it could be reached and operated by a passenger of a vehicle, seated to the right of the driver. It is also within the scope of this disclosure for the system 10 to be located in the rear seat area of the vehicle compartment allowing for passengers seated behind the driver to operate the arrangement.

The vehicle human-machine-interface system 10 includes a reconfigurable display 12 configured to selectively display a plurality of display configurations. For example, various display configurations could include a vehicle HVAC system, audio system, infotainment system, navigation system, or any other information desired to be viewed and controlled by the driver of the vehicle. The display 12 is configured to display, at the least, a first display configuration and a second display configuration, where the first and second display configurations are at least partially different from each other. For example, the first display configuration could include the vehicle audio controls, such as radio volume, and the second display configuration could include the vehicle HVAC controls, such as vehicle temperature and/or fan speed.

The system 10 includes a knob 14 that is repositionable along the reconfigurable display 12 in at least a first position 16 and a second position 18. In this example, the knob 14 is also repositionable into a third position 20. It should be understood, however, that the knob 14 could be repositioned into any number of desired positions, including four or more positions, without falling beyond the spirit and scope of the present disclosure.

The reconfigurable display 12 may be a display screen that is configured to display a set of parameters related to the vehicle, such as volume, fan speed, temperature, navigation, radio stations, other infotainment parameters, or any other desirable parameters that are selectable by a user, by way of example. Each of these sets of parameters may be displayed on the display 12 in a reconfigurable display configuration. For example, the display screen 12 is reconfigurable such that a first display configuration is shown on the display 12 when the knob 14 is in the first position 16, and a second display configuration is shown on the display 12 when the knob 14 is in the second position 18. Likewise, a third display configuration may be shown on the display 12 when the knob 14 is in the third position 20. The first display configuration may include the volume controls, the second display configuration may include the fan speed, and the third display configuration may include the temperature, by way of example. In the alternative, the display configurations may include other vehicle parameters, such as radio station, navigation, or audio input, by way of example, or any other desired parameters.

Figure 2:
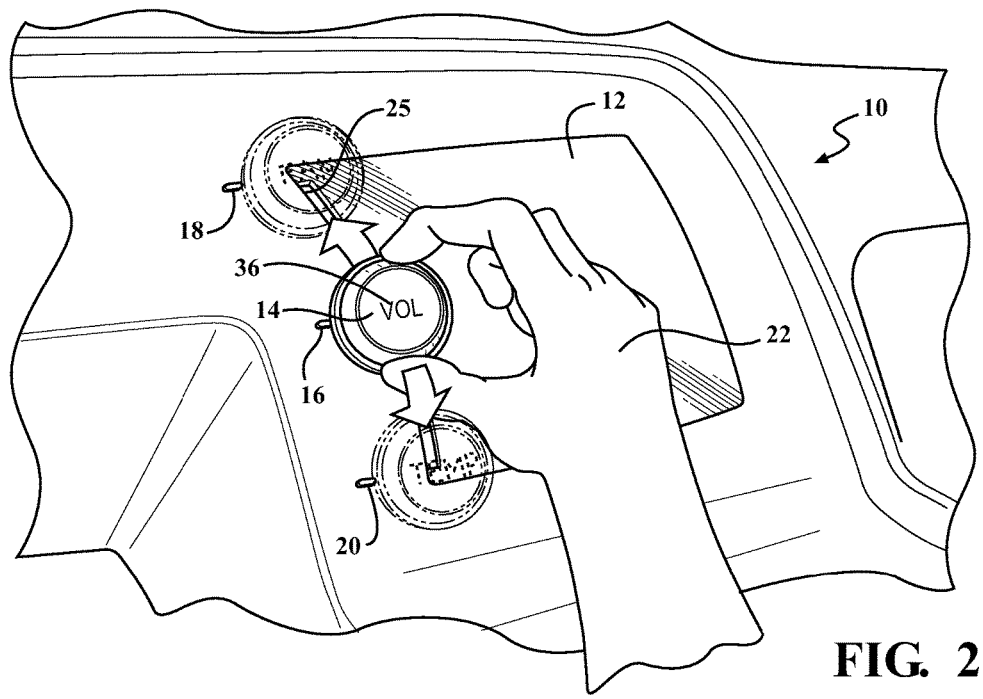
FIG. 2 is a schematic perspective view of the system of FIG. 1 including a knob movable between first, second, and third positions, in accordance with the principles of the present invention.

Referring now to FIG. 2, the knob 14 may be repositionable by a user 22 between the first position 16, the second position 18, and the third position 20, or any number of other positions, by way of example. For example, the knob 14 may be slidable between the first position 16, the second position 18, and the third position 20, as well as any additional positions (not shown).

Figure 3:
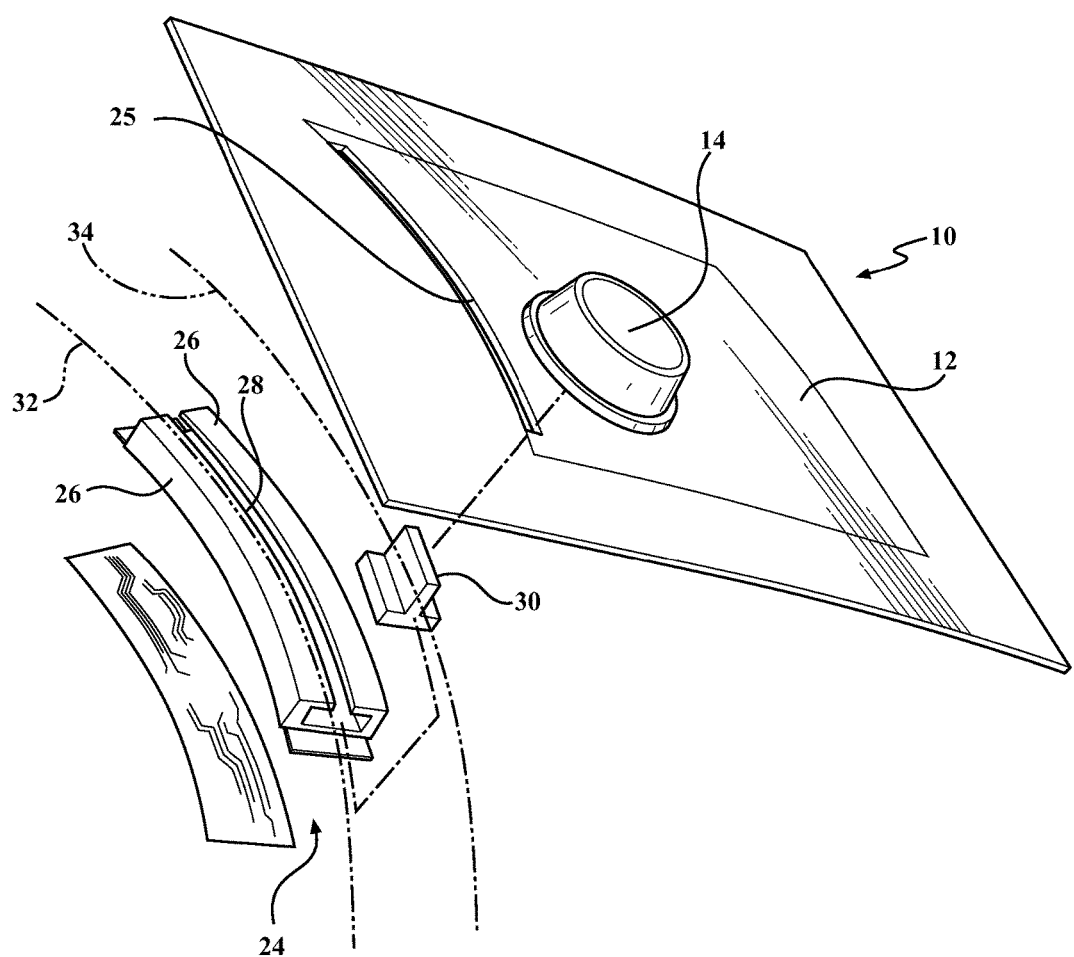
FIG. 3 is an exploded view of the system of FIGS. 1-2, according to the principles of the present disclosure.

Referring to FIG. 3, the system 10 may include a slider device 24 that includes rails 26 defining a slider track 28. The slider device 24 and the slider track 28 are disposed adjacent to the reconfigurable display 12. The knob 14 has an extension 30 disposed within rails 26, where the extension 30 is slidable within the slider track 28. Thus, the knob 14 is connected to the extension 30, which is slidable within the track 28, and both the knob 14 and the extension are slidable along the display 12.

In the first position 16, the knob 14 is configured to control a first set of parameters. In the second position 18, the knob 14 is configured to control a second set of parameters. And in the third position 20, the knob 14 is configured to control a third set of parameters, where the display 12 displays a third display configuration when the knob 14 is in the third position 20. The parameters from any set may include volume, fan speed, temperature, navigation input, radio station, etc., as explained above. Thus, the knob 14 is slidable into the various positions 16, 18, 20 along the track 28.

The knob 14 may be rotatable to selectively change parameters of any of the sets of parameters. Thus, in the first position 16, for example, the knob 14 may be rotatable to control the volume; in the second position 18, the knob 14 may be rotatable to control the fan speed; and in the third position 20, the knob 14 may be rotatable to control the temperature, by way of example.

A controller (not shown) may be electronically and communicatively coupled to both the knob 14 and the display 12 to allow the knob 14 to effectuate the various controls described above based on the position of the knob 14. Thus, the display screen 12 is controlled by the knob 14 based on the position of the knob 14 along the side 25 of the display screen 12.

In some variations, the slider track 28 and the rails 26 form a curve 32 and the knob 14 slides along a curve 34 corresponding to the curve 32 of the slider track 28 and the rails 26. In other variations, the slider device 24 may be disposed along a linear straight-line path. Still in other variations, the slider device 24 may have a sharp bend. Any other suitable path may be used by the slider device 24 and the extension 30, within the spirit and scope of the present disclosure.

Thus, the knob 14 may be moved into one of the positions 16, 18, 20. From there, a particular set of parameters are displayed on the display 12, depending on the position 16, 18, 20 of the knob 14. The set of parameters displayed for control depends on the position of the knob 14. The parameters may be controlled by touching the display 12, in some variations, and/or by rotating the knob 14 and/or pushing on the knob 14. If a user 22 wants to control a different set of parameters, the user 22 then slides the knob 14 along the track 28 to a different position 16, 18, 20.

When the first display configuration is being displayed, the second and third displayed configurations are preferably not being displayed on the display screen 12. Thus, even if some parameters remain the same between knob positions 16, 18, 20, such as a clock, at least some other parameters change when the display configurations are changed.

The display 12 may be a touch screen, such as a glass or polymer surface with a capacitive film connected to the glass or polymer surface. In some variations, the display 12 may be a thin film transistor (TFT). In other variations, the display 12 may not be a touch screen or touch-sensitive, such as an LCD screen. The display 12 can be used to electronically display one or more icons to show the sets of parameters.

Although the knob 14 is shown being used in conjunction with a slider device 24, it should be understood that the knob 14 could be repositioned in other ways, without falling beyond the spirit and scope of the present invention. For example, the knob 14 may be repositioned by the user 24 picking up the knob 14 and placing the knob 14 into another position 16, 18, 20, among other methods of repositioning.

Figure 4:
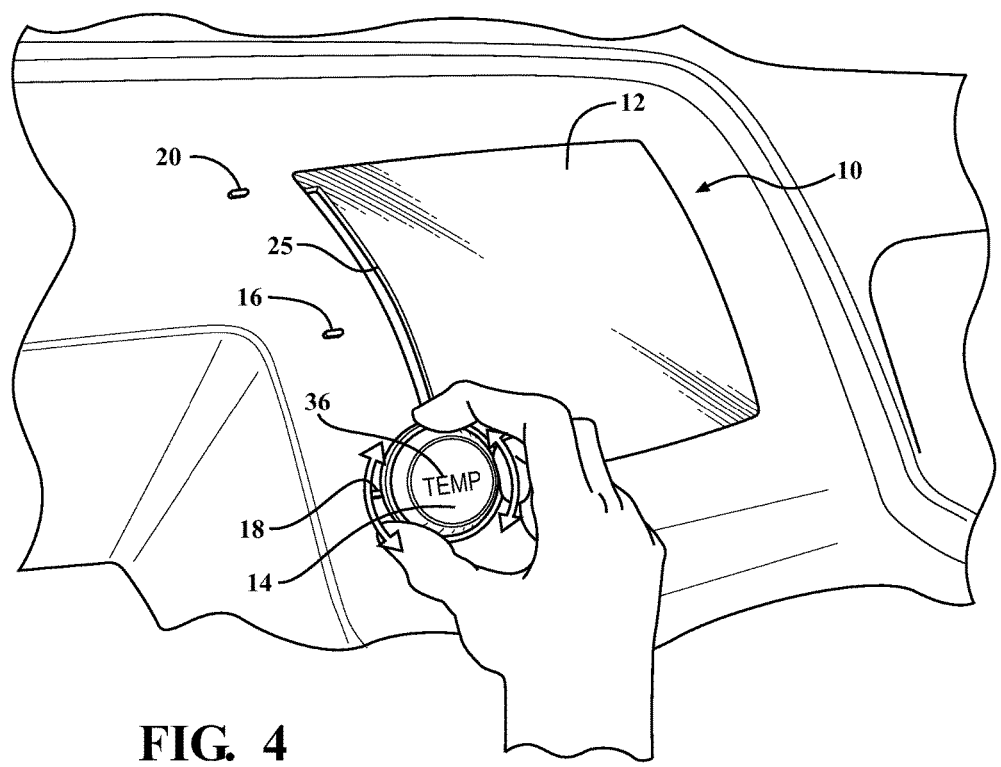
FIG. 4 is a schematic perspective view of the system of FIGS. 1-3 including a knob in a third position, in accordance with the principles of the present disclosure.

In some variations, a label 36 on the knob 14 may also change depending on the position 16, 18, 20 of the knob 14. For example, the knob 14 may display a first label, such as "Vol.", in the first position 16, to indicate that volume is being controlled by the knob 14 in the first position 16. Referring to FIG. 4, by way of example, the knob 14 may display a second label, such as "Temp.", in the second position 18, to indicate that the temperature is being controlled by the knob 14 in the second position 18. Similarly, the label 36 of the knob 14 may change to a third label, such as "Fan" (see FIG. 2) to indicate a third set of parameters in the third position 20.

The description is merely exemplary in nature and, thus, variations that do not depart from the essence of the invention are intended to be within the scope of the invention. Such variations are not to be regarded as a departure from the spirit and scope of the invention.

What is claimed is:

1. A vehicle human-machine-interface system comprising:

a reconfigurable convex display configured to selectively display at least a first display configuration and a second display configuration, the first and second display configurations being at least partially different from each other; and a knob which is attached to an extension, the extension being repositionable between a pair of substantially parallel convex rails which have a length and which are located alongside the reconfigurable convex display, the reconfigurable convex display displaying the first display configuration when the knob is at a first discrete position along the length of, and between, the pair of convex rails and displaying the second display configuration when the knob is at a second discrete position, along the length of, and between, the pair of convex rails, wherein the knob is additionally configured to rotate when the knob is in both the first and second discrete positions, wherein, when the knob is in the first discrete position, the knob selectively controls a first set of parameters and when the knob is in the second discrete position, the knob selectively controls a second set of parameters, the first and second sets of parameters being different from each other.

2. The vehicle human-machine-interface system according to claim 1, the knob being further repositionable along the reconfigurable convex display in a third position, wherein the system is configured to display a third display configuration on the reconfigurable convex display when the knob is in the third position.

3. The vehicle human-machine-interface system according to claim 2, wherein the knob is further slidable into the third position, the knob being configured to control a third set of parameters in the third position, the third set of parameters being different from the first and second sets of parameters, the knob being rotatable to selectively change parameters of the third sets of parameters.

4. The vehicle human-machine-interface system of claim 3, wherein the reconfigurable convex display is a display screen configured to display infotainment information of a vehicle.

5. The vehicle human-machine-interface system of claim 4, wherein the knob is configured to control audio volume in the first position, fan speed in the second position, and temperature in the third position.

* * * * *